United States Patent

Fujimoto et al.

[11] Patent Number: 5,349,261
[45] Date of Patent: Sep. 20, 1994

[54] VIBRATOR

[75] Inventors: Katsumi Fujimoto; Kazuhiro Yoshitani; Akira Mori; Takeshi Nakamura, all of Nagaokakyo, Japan

[73] Assignee: Murata Manufacturing Co., Ltd., Kyoto, Japan

[21] Appl. No.: 36,723

[22] Filed: Mar. 25, 1993

[30] Foreign Application Priority Data

Mar. 30, 1992 [JP] Japan .................................. 4-105539
Dec. 9, 1992 [JP] Japan .................................. 4-352643

[51] Int. Cl.$^5$ .............................................. H01L 41/08
[52] U.S. Cl. ................................................ 310/321
[58] Field of Search ........................ 310/320–322, 310/367

[56] References Cited

U.S. PATENT DOCUMENTS

| | | | |
|---|---|---|---|
| 2,271,200 | 1/1942 | Mason | 310/321 |
| 2,443,471 | 6/1948 | Mason | 310/326 |
| 3,369,200 | 2/1968 | Künemund et al. | 310/321 |
| 3,566,313 | 2/1971 | Yuki et al. | 310/321 |
| 5,117,148 | 5/1992 | Nakamura et al. | 310/367 |

FOREIGN PATENT DOCUMENTS

| | | | |
|---|---|---|---|
| 2082164 | 3/1990 | Japan | 310/321 |
| 4049873 | 2/1992 | Japan | 310/321 |

*Primary Examiner*—Thomas M. Dougherty
*Attorney, Agent, or Firm*—Nikaido, Marmelstein, Murray & Oram

[57] ABSTRACT

A vibrator 10 includes a regular triangular prism-shaped vibrating body 12. On centers of three side faces of the vibrating body 12, piezoelectric elements 14a, 14b and 14c are formed, respectively. Two piezoelectric elements and 14b are used for driving and detecting. The other piezoelectric element 14c is used for feedback. By trimming a ledge-line portion 12a of the vibrating body 12, a resonance frequency on driving side is controlled. By trimming ledge-line portions 12b and 12c of the vibrating body 12, two resonance frequencies on detecting side are controlled.

6 Claims, 5 Drawing Sheets

F I G. 1
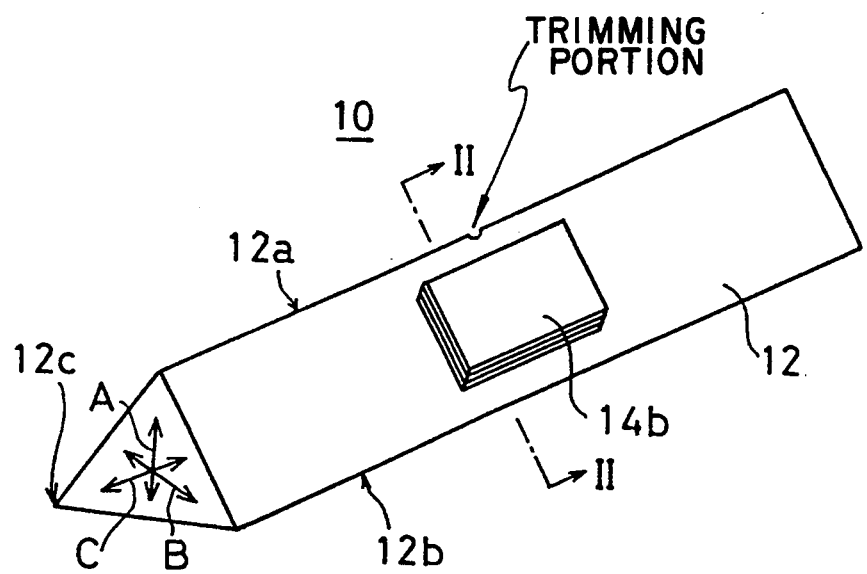
F I G. 2
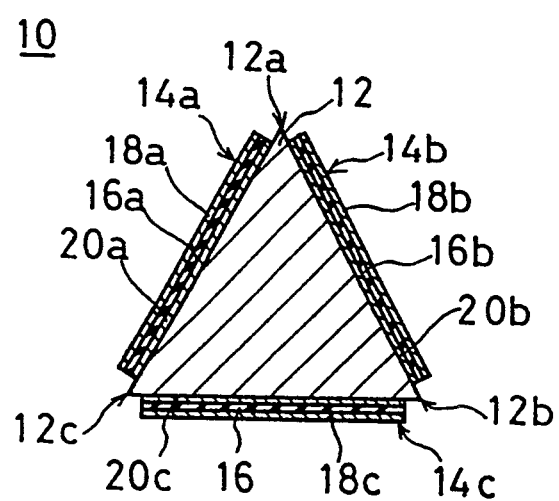

F I G. 3
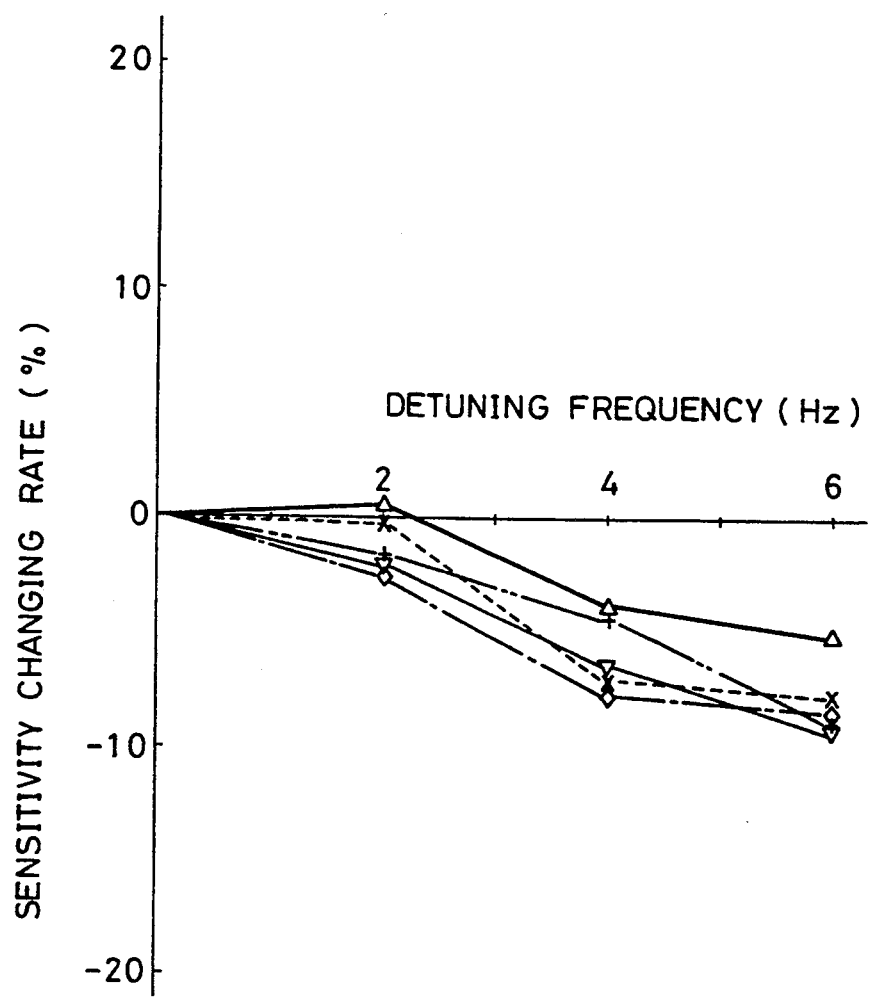

F I G. 4
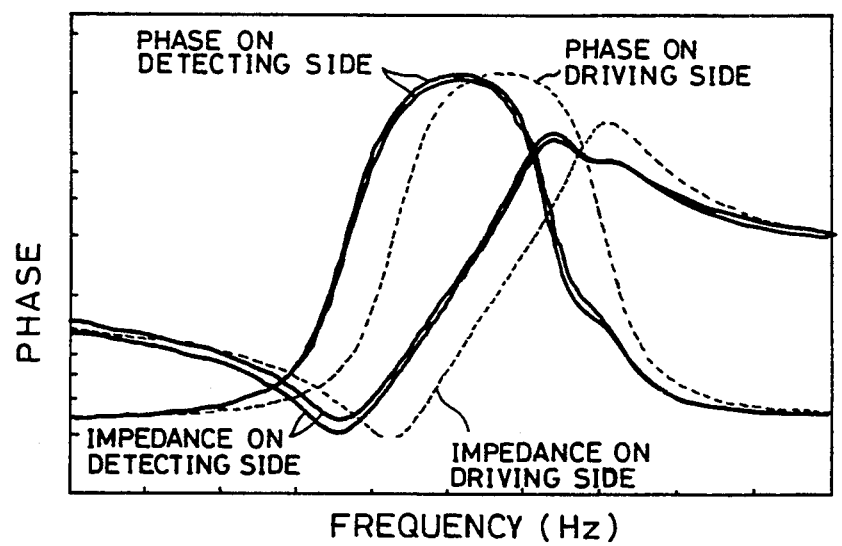
F I G. 5
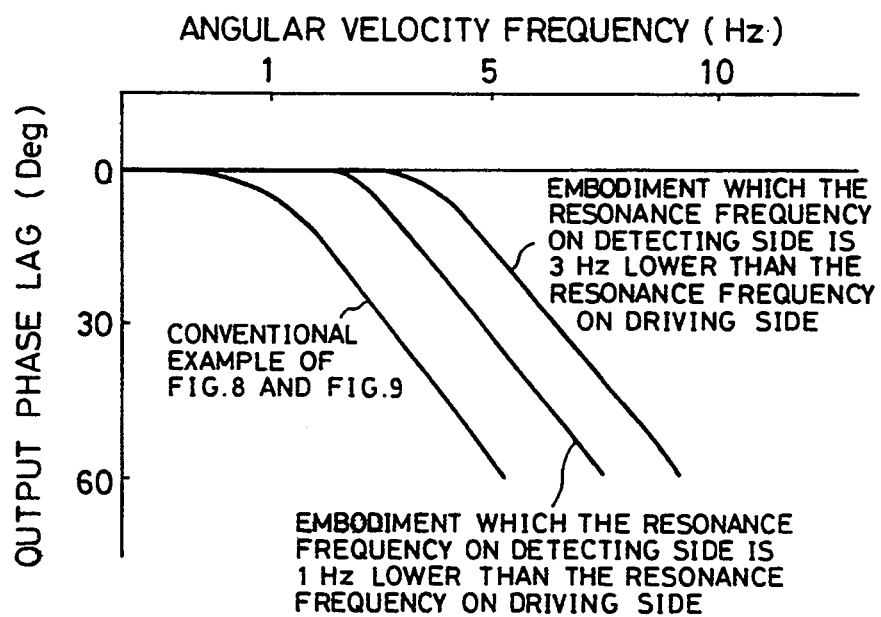

F I G. 6
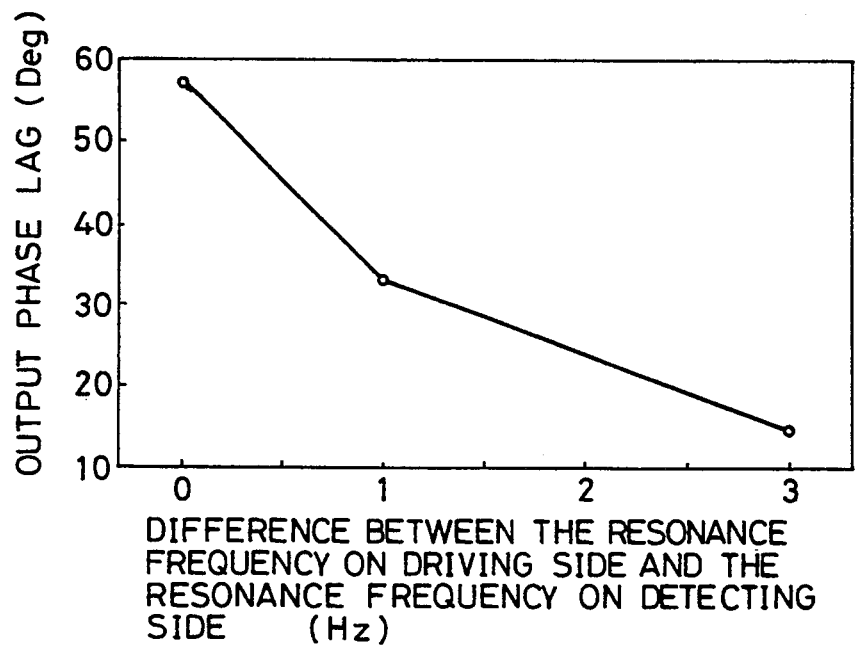
F I G. 7
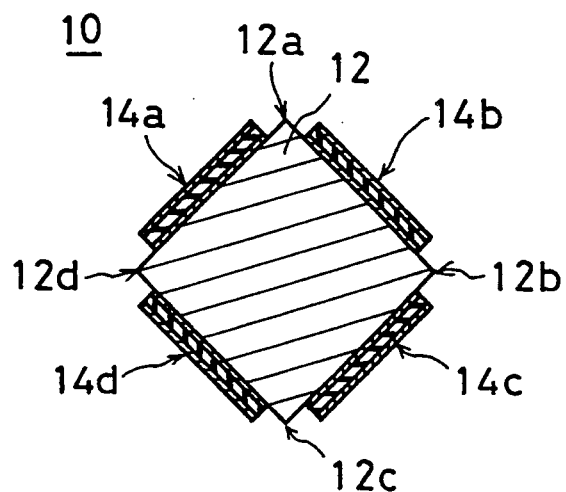

VIBRATOR

BACKGROUND OF THE INVENTION

1. Field of the Invention

The present invention relates to a vibrator and, more particularly, to a vibrator used in a vibratory gyroscope that is applied to a navigation system which detects a position of a mobile by detecting its angular velocity and properly guides it, or to a yaw rate sensor which detects external vibration for the purpose of properly damping it.

2. Description of the Prior Art

FIG. 8 is a perspective view showing an example of a conventional vibrator for a vibratory gyroscope, and FIG. 9 is a sectional view taken along the line IX—IX of FIG. 8. The vibrator 1 comprises a vibrating body 2. The vibrating body 2 is formed into a regular triangular prism shape with, for example, a constant elastic metal material. On centers of three side faces of the vibrating body 2, piezoelectric elements 3a, 3b and 3c are bonded, respectively. The piezoelectric elements 3a, 3b and 3c are made, for example, by forming electrodes on both surface of a piezoelectric ceramic, respectively.

In the vibrator 1, for example, two piezoelectric elements 3a and 3b are used for driving and for detecting, the other piezoelectric element 3c is used for feedback.

Furthermore, in the vibrator 1, since the vibrating body 2 is formed into a regular triangular prism shape; a resonance frequency on driving side coincides with a resonance frequency on detecting side.

When the vibrator 1 is used in a vibratory gyroscope, for example, between the piezoelectric element 3c for feedback and the piezoelectric elements 3a and 3b for driving, an oscillation circuit is connected as a feedback loop for self-driving. By a signal from the oscillation circuit, the vibrating body 2 bends and vibrates in a direction orthogonal to the face whereon the piezoelectric element 3c for feedback is formed. When the vibrator 1 is rotated in this state, a difference of output voltages is produced between two piezoelectric elements 3a and 3b for detecting, the rotational angular velocity can be detected by measuring the difference of the output voltages.

Meanwhile, in the vibrator 1, for example, two piezoelectric elements 3a and 3b can be used for feedback and detecting, the other piezoelectric element 3c can be used for driving.

In the vibratory gyroscope used the vibrator shown in FIG. 8 and FIG. 9, a circuit for processing an output signal is connected. The circuit includes an amplifier having a variable resistor, the sensitivity of the vibratory gyroscope is controlled by adjusting the variable resistor.

However, when such a circuit is used, the vibratory gyroscope becomes a large size, it can not meet the demands of small size and lightweight.

Also, in the vibrator shown in FIG. 8 and FIG. 9, since the resonance frequency on driving side coincides with the resonance frequency on detecting side, an equivalent quality factor on detecting side is high. Therefore, in the vibrator, a phase lag of an output on detecting side is large, the output response characteristic is bad.

Furthermore, in the vibrator shown in FIG. 8 and FIG. 9, since the resonance frequency on driving side coincides with the resonance frequency on detecting side, the oscillation frequency of the vibrator coincides with the resonance frequency on detecting side. However, since the impedance frequency characteristic of the vibrator is nonlinear around the resonance frequency, when the oscillation frequency or the impedance frequency characteristic of the vibrator is changed by temperature change, a drift component is easily generated in the output difference between two piezoelectric elements for detecting.

SUMMARY OF THE INVENTION

It is therefore a primary object of the present invention to provide a vibrator which can obtain a small size and lightweight vibratory gyroscope.

A vibrator according to the present invention comprises a polygonal prism-shaped vibrating body and a piezoelectric element formed on a side face of the vibrating body, wherein an intermediate portion of a ledge-line portion of the vibrating body is trimmed.

In the vibrator according to the present invention, by trimming the intermediate portion of the ledge-line portion of the vibrating body, the bending and vibrating resonance frequency is changed in a direction to the trimmed ledge-line and the side face of the vibrating body opposite thereto. By changing a difference between a resonance frequency on driving side and a resonance frequency on detecting side, the sensitivity of the vibrator is changed.

In the vibrator according to the present invention, since the sensitivity thereof can be changed by trimming the ledge-line portion of the vibrating body, a variable resistor for controlling the sensitivity is unnecessary. Therefore, when the vibrator according to the present invention is used in a vibratory gyroscope, the vibratory gyroscope becomes small size and lightweight.

It is another object of the present invention to provide a vibrator which the output response characteristic and the drift characteristic are good.

An another vibrator according to the present invention comprises a polygonal prism-shaped vibrating body and a piezoelectric element formed on a side face of the vibrating body, wherein a resonance frequency on driving side is different from a resonance frequency on detecting side by trimming an intermediate portion of a ledge-line portion of the vibrating body.

In the another vibrator according to the present invention, since the resonance frequency on driving side is different from the resonance frequency on detecting side, the equivalent quality factor on detecting side becomes low. Therefore, in the another vibrator according to the present invention, a phase lag of an output on detecting side becomes small, the output response characteristic becomes good.

Furthermore, in the another vibrator according to the present invention, since the resonance frequency on driving side is different from the resonance frequency on detecting side, the another vibrator oscillates in an area which the impedance frequency characteristic on detecting side is linear. Therefore, in another vibrator according to the present invention, the drift characteristic becomes good.

The above and other objects, features, aspects and advantages of the present invention will become more apparent from the following detailed description of the embodiments with reference to the accompanying drawings.

BRIEF DESCRIPTION OF THE DRAWINGS

FIG. 1 is a perspective view showing one embodiment of the present invention.

FIG. 2 is a sectional view taken along the line II—II of FIG. 1.

FIG. 3 is a graph showing the relation between the detuning frequency and the sensitivity changing rate of the embodiment of FIG. 1 and FIG. 2.

FIG. 4 is a graph showing the impedance frequency characteristic and the phase frequency characteristic on driving side and detecting side in the embodiment shown in FIG. 1 and FIG. 2 which the resonance frequency on detecting side is 3 Hz lower than the resonance frequency on driving side.

FIG. 5 is a graph showing the output phase lag characteristics against angular velocity frequency in the embodiment shown in FIG. 1 and FIG. 2 which the resonance frequency on detecting side is 3 Hz lower than the resonance frequency on driving side, in the embodiment shown in FIG. 1 and FIG. 2 which the resonance frequency on detecting side is 1 Hz lower than the resonance frequency on driving side, and in the conventional example shown in FIG. 8 and FIG. 9.

FIG. 6 is a graph showing the output phase lag characteristic against the difference between the resonance frequency on driving side and the resonance frequency on detecting side in the vibrator applied 5 Hz angular velocity.

FIG. 7 is a sectional view showing another embodiment of the present invention.

DESCRIPTION OF THE PREFERRED EMBODIMENTS

Figure 8:
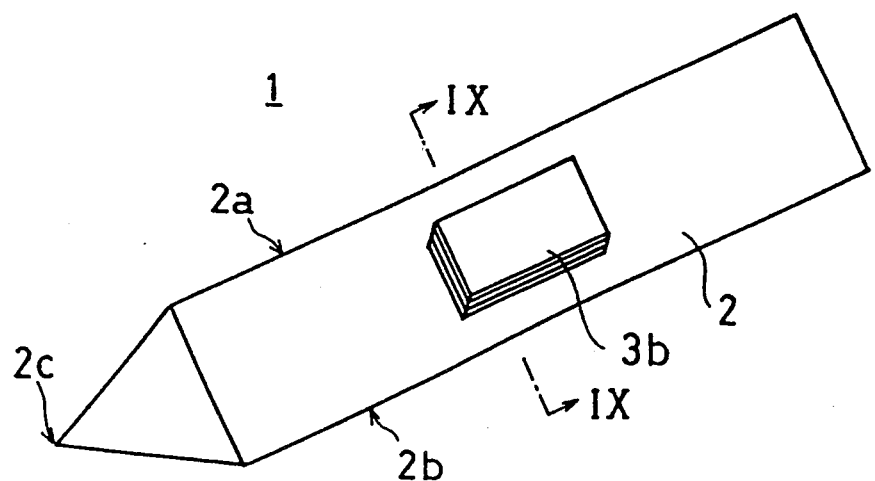
FIG. 8 is a perspective view showing an example of a conventional vibrator for a vibratory gyroscope.

FIG. 1 is a perspective view showing one embodiment of the present invention, and FIG. 2 is a sectional view taken along the line II—II of FIG. 1. The vibrator 10 comprises a vibrating body 12. The vibrating body 12 is formed into a regular triangular prism shape with, for example, a constant elastic metal material. On centers of three side faces of the vibrating body 12, piezoelectric elements 14a, 14b and 14c are formed, respectively. The piezoelectric element 14a includes, for example, a piezoelectric body 16a. On both faces of the piezoelectric body 16a, electrodes 18a and 20a are formed, respectively. One electrode 20a is bonded to the side face of the vibrating body 12. Similarly, the piezoelectric elements 14b and 14c include piezoelectric bodies 16b and 16c, on both faces of the piezoelectric bodies 16b and 16c, electrodes 18b, 18c, 20b and 20c are formed, respectively. The electrodes 20b and 20c are bonded to the side faces of the vibrating body 12. In the vibrator 10, two piezoelectric elements 14a and 14b are used for driving and detecting, the other piezoelectric element 14c is used for feedback.

When the vibrator 10 is used in a vibratory gyroscope, for example, between the piezoelectric element 14c for feedback and the piezoelectric elements 14a and 14b for driving, an oscillation circuit is connected as a feedback loop for self-driving. Furthermore, two piezoelectric elements 14a and 14b for detecting are connected to two input terminals of a differential amplifier circuit as a detection circuit, respectively.

Therefore, by a signal from the oscillation circuit, the vibrator 10 bends and vibrates in a direction orthogonal to the face whereon the piezoelectric element 14c for feedback is formed.

In this state, when the vibrator 10 is rotated about an axial direction thereof, the vibrating direction is changed by a Coriolis force, a difference between voltages generated in two piezoelectric elements 14a and 14b for detecting. The difference between the output voltages of the piezoelectric elements 14a and 14b is amplified by the differential amplifier circuit. Therefore, the rotational angular velocity applied to the vibrator 10 can be detected by the output of the differential amplifier circuit.

In the vibrator 10, resonance frequencies are controlled by trimming intermediate portions of ledge-line portions of the vibrating body 12. In this case, by trimming a ledge-line portion 12a between the faces whereon the piezoelectric elements 14a and 14b are formed, the bending and vibrating resonance frequency is controlled in a direction A linked the ledge-line portion 12a and the face opposite thereto. Also, by trimming a ledge-line portion 12b between the faces whereon the piezoelectric elements 14b and 14c are formed, the bending and vibrating resonance frequency is controlled in a direction B linked the ledge-line portion 12b and the face opposite thereto. Similarly, by trimming a ledge-line portion 12c between the faces whereon the piezoelectric elements 14a and 14c are formed, the bending and vibrating resonance frequency is controlled in a direction C linked the ledge-line portion 12c and the face opposite thereto.

When the resonance frequency of the direction B coincides with the resonance frequency of the direction C, a difference between the resonance frequency of the direction A and the resonance frequency of the directions B and C is defined as a detuning frequency. Then, the relation between the detuning frequency and the sensitivity changing rate of the vibrator 10 is shown in FIG. 3. As shown in FIG. 3, by controlling the detuning frequency, the sensitivity changing rate of the vibrator 10 can be controlled. In this case, after coinciding the resonance frequencies of the directions A, B and C, by trimming the intermediate portions of the ledge-line portions 12a, 12b and 12c of the vibrating body 12, the detuning frequency can be controlled.

For example, when the sensitivity of the vibrator 10 is low, by trimming the intermediate portion of the ledge-line portion 12a of the vibrating body 12, the resonance frequency of the direction A becomes low, thereby the sensitivity can be increased. Also, when the sensitivity of the vibrator 10 is high, by trimming the intermediate portions of the ledge-line portions 12b and 12c, the resonance frequencies of the directions B and C become low, thereby the sensitivity can be decreased. The vibrating body 12 can be trimmed by shaving or laser heat melting of the ledge-line portions 12a, 12b and 12c.

In the vibrator 10, since the sensitivity is controlled by trimming the ledge-line portions of the vibrating body 12, a variable resistor for controlling the sensitivity is unnecessary in a circuit for processing the output signal. Therefore, the vibratory gyroscope becomes small size and lightweight.

Next, it will be described that two resonance frequencies on detecting side coincide with each other and the resonance frequency on detecting side is 3 Hz lower than the resonance frequency on driving side by trimming the center portions of the ledge-line portions 12a, 12b and 12c in the vibrator 10 of this embodiment. In this case, as the intermediate portion of the ledge-line portion 12a of the vibrating body 12 between the piezoelectric elements 14a and 14b is trimmed, the resonance frequency on driving side becomes lower. Also, as the intermediate portion of the ledge-line portion 12b of the vibrating body 12 between the piezoelectric elements 14b and 14c is trimmed, one resonance frequency on detecting side becomes lower, as the intermediate portion of the ledge-line portion 12c of the vibrating body 12 between the piezoelectric elements 14a and 14c is trimmed, the other resonance frequency on detecting side becomes lower.

The impedance frequency characteristic and the phase frequency characteristic on driving side and detecting side of the vibrator 10 are shown in FIG. 4.

In the vibrator 10, since the resonance frequency on driving side is different from the resonance frequency on detecting side, the equivalent quality factor on detecting side becomes low. Therefore, in the vibrator 10, the phase lag of the output on detecting side is decreased, the output response characteristic becomes good.

Furthermore, in the vibrator 10, since the resonance frequency on driving side is different from the resonance frequency on detecting side, the vibrator 10 oscillates in an area which the impedance frequency characteristic on detecting side is linear. Therefore, in the vibrator 10, the drift characteristic becomes good.

Figure 9:
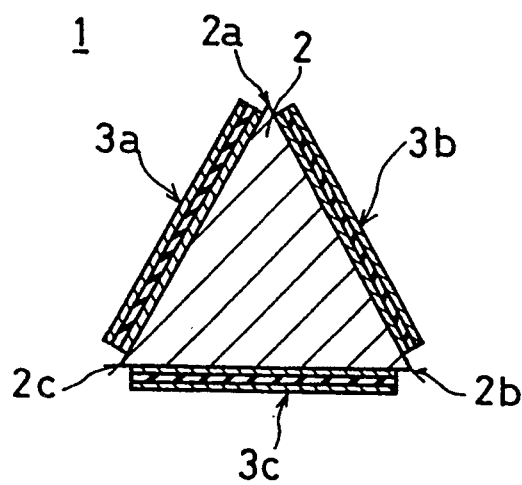
FIG. 9 is a sectional view taken along the line IX—IX of FIG. 8.

FIG. 5 is a graph showing the output phase lag characteristics against angular velocity frequency in the embodiment shown in FIG. 1 and FIG. 2 which the resonance frequency on detecting side is 3 Hz lower than the resonance frequency on driving side, in the embodiment shown in FIG. 1 and FIG. 2 which the resonance frequency on detecting side is 1 Hz lower than the resonance frequency on driving side, and in the conventional example shown in FIG. 8 and FIG. 9.

FIG. 6 is a graph showing the output phase lag characteristic against the difference between the resonance frequency on driving side and the resonance frequency on detecting side in the vibrator applied 5 Hz angular velocity.

As shown in the graphs of FIG. 5 and FIG. 6, when the resonance frequency on driving side is different from the resonance frequency on detecting side in the vibrator, the output response characteristic becomes good.

Meanwhile, in the vibrator 10 shown in FIG. 1 and FIG. 2, two piezoelectric elements 14a and 14b may be used for feedback and detecting, the other piezoelectric element 14c may be used for driving.

FIG. 7 is a sectional view showing another embodiment of the present invention. The vibrator 10 shown in FIG. 7 comprises particularly a regular quadrangular prism-shaped vibrating body 12. On centers of four side faces of the vibrating body 12, piezoelectric elements 14a, 14b, 14c and 14d are formed, respectively.

In the vibrator 10 shown in FIG. 7, two piezoelectric elements 14a and 14b are used for driving and detecting, the other two piezoelectric elements 14c and 14d are used for feedback.

Furthermore, in the vibrator 10 shown in FIG. 7, by trimming center portions of ledge-line portions 12a, 12b, 12c and 12d of the vibrating body 12, the resonance frequency on driving side is different from two resonance frequencies on detecting side. In this case, as the intermediate portion of the ledge-line portion 12a of the vibrating body 12 between the piezoelectric elements 14a and 14b or the ledge-line portion 12c between the piezoelectric elements 14c and 14d is trimmed, the resonance frequency on driving side becomes lower. Also, as the intermediate portion of the ledge-line portion 12b of the vibrating body 12 between the piezoelectric elements 14b and 14c is trimmed, one resonance frequency on detecting side becomes lower, as the intermediate portion of the ledge-line portion 12d of the vibrating body 12 between the piezoelectric elements 14a and 14d is trimmed, the other resonance frequency on detecting side becomes lower.

In the vibrator 10 shown in FIG. 7, since the resonance frequency on driving side is different from the resonance frequency on detecting side, the output response characteristic and the drift characteristic are good, too.

Also, in the vibrator 10 shown in FIG. 7, by trimming the ledge-line portions 12a, 12b, 12c and 12d, the detuning frequency and the sensitivity can be controlled.

Meanwhile, in the vibrator 10 shown in FIG. 7, two piezoelectric elements 14a and 14b may be used for driving, the other two piezoelectric elements 14c and 14d may be used for feedback and detecting.

In the above-mentioned embodiments, the piezoelectric element for only feedback is not formed. In this case, the piezoelectric element for detecting is used for feedback, too.

Also, in the present invention, an intermediate portion of a ledge-line portion of the other polygonal prism-shaped vibrating body besides the regular triangular prism-shaped and the regular quadrangular prism-shaped may be trimmed.

It will be apparent from the foregoing that, while the present invention has been described in detail and illustrated, these are only particular illustrations and examples, and the invention is not limited to these. The spirit and scope of the invention is limited only by the appended claims.

What is claimed is:

1. A vibrator comprising:
   a polygonal prism-shaped vibrating body; and
   a piezoelectric element formed on a side face of said vibrating body;
   wherein an intermediate portion of a ledge-line portion of said vibrating body, only where said piezoelectric element is formed, is trimmed.

2. A vibrator according to claim 1, wherein said vibrating body includes a triangular prism-shaped vibrating body.

3. A vibrator according to claim 1, wherein said vibrating body includes a quadrangular prism-shaped vibrating body.

4. A vibrator comprising:
   a polygonal prism-shaped vibrating body; and
   a piezoelectric element formed on a side face of said vibrating body;
   wherein a resonance frequency on a vibrating direction of said vibrating body at non-rotation is different from a resonance frequency on a direction orthogonal to said side face of said vibrating body by trimming an intermediate portion of a ledge-line portion of said vibrating body only where said piezoelectric element is formed.

5. A vibrator according to claim 4, wherein said vibrating body includes a triangular prism-shaped vibrating body.

6. A vibrator according to claim 4, wherein said vibrating body includes a quadrangular prism-shaped vibrating body.

* * * * *